May 19, 1925.
J. A. STREUN
1,538,362
AUTOMATICALLY RELEASING COTTON PRESS LATCH
Filed Oct. 18, 1924
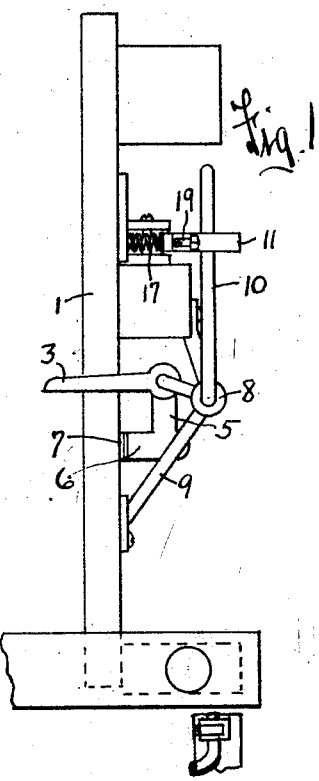
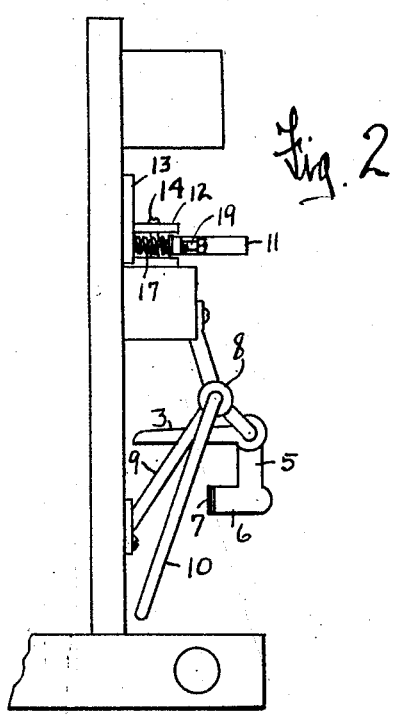
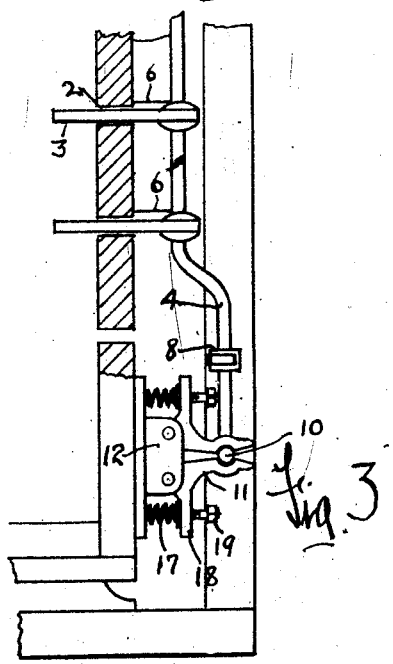
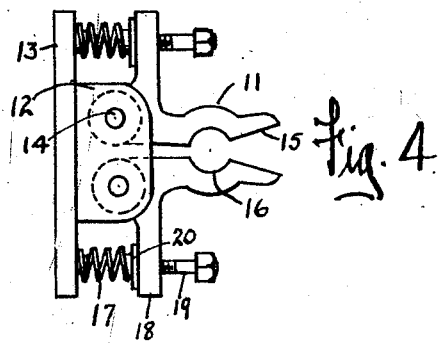
John A. Streun, Inventor
By Jesse R. Stone, his Attorney Patented May 19, 1925.

1,538,362

UNITED STATES PATENT OFFICE.

JOHN ARNOLD STREUN, OF SHERMAN, TEXAS, ASSIGNOR TO HARDWICKE-ETTER COMPANY, OF SHERMAN, TEXAS, A CORPORATION OF TEXAS.

AUTOMATICALLY-RELEASING COTTON-PRESS LATCH.

Application filed October 18, 1924. Serial No. 744,504.

*To all whom it may concern:*

Be it known that I, JOHN A. STREUN, a citizen of the United States, residing at Sherman, Grayson County, Texas, have invented a certain new and useful Improvement in Automatically-Releasing Cotton-Press Latches, of which the following is a specification.

My invention relates to latching means for the cotton retaining dogs ordinarily employed on cotton presses.

In baling cotton in a cotton press, the loose fluffy cotton is fed from the condenser to the box of the press and there gradually compressed by a cotton tramper. A plunger is operated to press the cotton down into the box, as it is fed therein. To prevent the resilient charge of cotton from following the plunger back upwardly after each stroke, dogs or fingers are provided which project from opposite sides of the box inwardly above the cotton. These fingers will be turned downwardly by the cotton as the said cotton is forced past them, but they can not be turned back above a practically horizontal plane as the plunger is withdrawn; and the said fingers will thus retain each charge in lowered position until the next succeeding charge is forced downwardly by the plunger.

When the box is packed full of cotton it will include about 500 pounds of the lint and the full box will be moved away from the condenser chute and plunger and be positioned above a powerful baling plunger or ram by means of which the cotton can be more tightly compressed and baled and then tied. The press plunger moves from the lower end of the box upwardly compressing the cotton against an upper platen. The fingers in the sides of the box should be moved by a lever away from the interior of the box before the ram or plunger is moved upwardly to compress the bale; but this operation of the dog-controlling lever is sometimes overlooked, with the result that the baling plunger will break or bend the fingers or operating rod.

The object of my invention is to provide a latch for the said dogs which will retain the dogs in position to resist the ordinary pressure of the packed cotton, but which will allow said dogs to be moved upwardly without injury, when excessive force is exerted against the dogs, as in case of the baling plunger.

It is desired to provide an automatically releasing latch for the operating lever which will release the said lever when a predetermined pressure is exerted upwardly on the dogs and to make the latch adjustable for release at different pressures as may be desired.

Referring to the drawings herewith, Fig. 1 is a side elevation of the device as applied to a cotton box. Fig. 2 is a similar view illustrating the parts in different position. Fig. 3 is a top plan view approximately on the plane 3—3 of Fig. 1. Fig. 4 is an enlarged detail of the latching means. Like numerals of reference are applied to like parts in all the views.

In the drawing, the cotton box 1 is shown as provided with vertical slots 2 between adjacent planks forming the walls thereof. The slots 2 provide space to receive the cotton retaining dogs or fingers 3 which project through the sides of the box into the path of the cotton but not into the path of the tramping plunger. The dogs 3 are mounted upon an operating rod 4 so as to turn loosely on said rod. Each dog has a downwardly extending arm 5, angular in shape, with a lug 6 on the lower end of sufficient length to bear at its forward end 7 against the wall of the box. The arm 5 and its lug thereon act as a weight tending to hold the dog in horizontal position. The lug 6 also prevents the upward rotation of the dog beyond the horizontal position but allows it to swing downwardly as the cotton passes.

The operating rod 4 upon which the dogs are mounted is rotatable in bearings 8 at each end, said bearings being spaced away from the walls by supporting legs 9 secured to the frame of the box. Between the bearings, the rod is bent inwardly toward the box, whereby the dogs which are mounted thereon, are on an eccentric portion adapted to swing toward and away from the box as the rod is rotated.

The rotation of the rod is accomplished by a lever arm 10 formed by bending one end of the rod 4 at right angles to the longitudinal portion of the rod. When the lever arm 10 is directed upwardly the dogs are projected through the side of the cotton box and are in operative position.

The lever arm 10 is latched in upright position to retain the dogs in position within the cotton box by my improved latch. Said latch comprises two cooperating spring-pressed pawls 11, shaped like a bell crank lever pivoted at the angle thereof. Said pawls are mounted between two uprights 12 upon an attaching plate 13 secured to the cotton press box. They are pivoted in closely spaced relation to each other on pins 14 extending through said pawls and said uprights.

The upwardly extending arms on said pawls are beveled or inclined inwardly at 15 to guide the rod lever into a sector-shaped recess 16 in each pawl. The arm of the lever is adapted to be resiliently retained in said recess by springs 17 which are mounted on the plate 13 and bear upwardly against the arms 18 of the latching arms. The tension on said springs is adjustable through screws 19 extending through arms 18 and having caps 20 on the lower ends furnishing bearings and retaining means for the upper end of the springs, as shown. It will be obvious that the adjusting of the screws will increase or decrease the compression on the springs in accordance with the direction of adjustment.

In operation, the handle or lever 10 is swung upwardly to pass between the two pawls 11 to be latched thereby in the recess 16. This will hold the dogs in operative position whereby they will be retained in the manner described. If the lever arm is not manually released when the bale is ready to be pressed, the pressure upwardly of the baling ram will force the dogs upwardly thus bearing outwardly on the lever arm 10 and forcing it from latched position thus withdrawing the dogs as shown in Fig. 2, avoiding damage to the dogs and rod. It will be obvious that the lever arm may be set so that it will release at various predetermined pressures, as desired, through use of the adjustment described.

While I have shown and described a specific embodiment of my invention, it is obviously capable of various modifications falling within the scope of my invention, and I do not wish to be limited except as indicated by the claims appended hereto.

What I claim as new and desire to protect by Letters Patent is:

1. In a device of the character described, a rotatable rod, dogs rotatable on said rod, means to prevent rotation upwardly of said dogs when they are in operative position, a lever arm on said rod, and a resilient latch adapted to engage said lever arm to retain said dogs in operative position, and to release said lever under a predetermined pressure on said dogs.

2. In a device of the character described, a rotatable rod, dogs rotatable on said rod, a lever arm on said rod, and means adapted to engage said rod to hold said dogs in operative position with a predetermined pressure.

3. In a device of the character described, a rotatable rod, dogs rotatable on said rod, means to limit upward rotation of said dogs on said rod when said dogs are in operative position, and means acting to hold said rod against rotation with a predetermined pressure.

4. In a device of the character described, a rotatable rod, dogs rotatable on said rod, means to limit the upward movement of said dogs on said rod when said dogs are in operative position, and resilient latching means retaining said rod against rotation with a predetermined pressure.

5. In a cotton press, a cotton box, a rod journalled to rotate thereon, dogs on said rod adapted to project into said box, a lever arm on said rod, a latch engaging said arm and adapted to release the same under a predetermined pressure on said dogs.

6. In a cotton press, a cotton box, a rod journalled to rotate thereon, dogs rotatable on said rod, means on said dogs bearing against said box to prevent upward rotation thereof when said dogs are projected into said box, a latch for said rod, adapted to automatically release said rod when said dogs are pressed upwardly with a predetermined force.

7. In a cotton press, a cotton box, a rod journalled thereon, dogs rotatable on said rod and projecting into said box, a lever arm on said rod, opposite spring pressed pawls providing a recess to receive said arm and latch said rod against rotation with a predetermined pressure.

8. In a cotton press, a cotton box, a rod journalled thereon, dogs on said rod projecting into said box, a lever arm on said rod, cooperating pawls having recesses to receive said arm, springs pressing said pawls together to hold said arm, and means to adjust the pressure of said springs as desired.

In testimony whereof I hereunto affix my signature October, A. D. 1924.

JOHN ARNOLD STREUN.